(12) United States Patent
Wu (10) Patent No.: US 9,383,859 B2
(45) Date of Patent: Jul. 5, 2016

(54) MULTI-MODE TOUCH INPUT DEVICE (71) Applicant: Primax Electronics Ltd., Taipei (TW)

(72) Inventor: Tung-Heng Wu, Taipei (TW)

(73) Assignee: PRIMAX ELECTRONICS LTD., Neihu (TW)

( * ) Notice: Subject to any disclaimer, the term of this patent is extended or adjusted under 35 U.S.C. 154(b) by 0 days.

(21) Appl. No.: 14/514,996

(22) Filed: Oct. 15, 2014

(65) Prior Publication Data

US 2016/0041678 A1      Feb. 11, 2016

(30) Foreign Application Priority Data

Aug. 8, 2014    (TW) .............................. 103127228 A (51) Int. Cl.
*G06F 1/00*      (2006.01)
*G06F 3/041*     (2006.01)

(52) U.S. Cl.
CPC .................................... *G06F 3/0416* (2013.01)

(58) Field of Classification Search
CPC ......... G06F 3/041; G06F 3/14; G06F 1/1652; G06F 1/169; G06F 1/165; G09G 5/22
See application file for complete search history.

(56) References Cited

U.S. PATENT DOCUMENTS

2013/0076679 A1*   3/2013  Kretz ................... G06F 3/1438
                                                    345/173
2014/0375596 A1*  12/2014  Kim ...................... G06F 3/0416
                                                    345/174

* cited by examiner

*Primary Examiner* — Michael Faragalla
(74) *Attorney, Agent, or Firm* — Kirton McConkie; Evan R. Witt (57) ABSTRACT

A multi-mode touch input device includes a first touch input device and a second touch input device. When a first lateral surface of the first touch input device and a first lateral surface of the second touch input device are combined together, both of the first touch input device and the second touch input device are operated in a keyboard mode, and the first touch input device and the second touch input device are collaboratively defined as a touch keyboard. When a second lateral surface of the first touch input device and a second lateral surface of the second touch input device are combined together, both of the first touch input device and the second touch input device are operated in a handwriting tablet mode, and the first touch input device and the second touch input device are collaboratively defined as a handwriting tablet.

9 Claims, 6 Drawing Sheets

MULTI-MODE TOUCH INPUT DEVICE

FIELD OF THE INVENTION

The present invention relates to an input device, and more particularly to a touch input device with a touch control function.

BACKGROUND OF THE INVENTION

The widely-used peripheral input device of a computer system comprises for example a mouse device, a keyboard device, a trackball device, or the like. With the progress of the times, a touch input device has been introduced into the market. By directly using the user's fingers or using a stylus to operate the touch input device, the computer system can be correspondingly controlled.

The applications of the touch input device are very extensive. In the early stage, a touch input device (i.e. also referred as a touchpad) is installed on a notebook computer. By operating the touch input device, the movement of a cursor may be controlled or a corresponding icon of a user interface may be clicked without the need of using a mouse to operate the notebook computer. In accordance with an advantage of the touchpad, the touchpad can be intuitively operated by the user and thus various commands can be correspondingly executed. With the advance of science and technology, a variety of touch input devices were developed. For example, a touch input device with a handwriting or drawing function (also referred as a handwriting tablet) has been introduced into the market. When the user writes characters or draws pictures on the handwriting tablet with the stylus or the finger, the corresponding characters or the corresponding pictures are shown on the computer system.

Generally, for facilitating carrying the touch input device, the touch input device is designed to have a small size while maintaining slimness and portability. However, the small-sized touch input device is not easily operated by the user. In addition, the manufacture has to impart more suitable functions to the touch input device.

Therefore, there is a need of providing an improved touch input device so as to overcome the drawbacks of the small-size touch input device.

SUMMARY OF THE INVENTION

An object of the present invention provides a multi-mode touch input device so as to overcome the drawbacks of the small-size touch input device.

In accordance with an aspect of the present invention, there is provided a multi-mode touch input device. The multi-mode touch input device includes a first touch input device and a second touch input device. The first touch input device generates a first touch signal. The second touch input device generates a second touch signal. When a first lateral surface of the first touch input device and a first lateral surface of the second touch input device are combined together, both of the first touch input device and the second touch input device are operated in a keyboard mode, and the first touch input device and the second touch input device are collaboratively defined as a touch keyboard. When a second lateral surface of the first touch input device and a second lateral surface of the second touch input device are combined together, both of the first touch input device and the second touch input device are operated in a handwriting tablet mode, and the first touch input device and the second touch input device are collaboratively defined as a handwriting tablet.

From the above descriptions, the first touch input device and the second touch input device of the multi-mode touch input device may be combined together to provide various outer shapes. When the first lateral surface of the first touch input device and the first lateral surface of the second touch input device are combined together, the multi-mode touch input device has a first outer shape. When the second lateral surface of the first touch input device and the second lateral surface of the second touch input device are combined together, the multi-mode touch input device has a second outer shape. Moreover, according to different outer shapes, the multi-mode touch input device provides different functions. For example, the first touch input device may be individually used as a handwriting tablet, the second touch input device may be individually used as a touchpad, the first touch input device and the second touch input device may be collaboratively used as a touch keyboard, or the first touch input device and the second touch input device may be collaboratively used as a handwriting tablet. In other words, the multi-mode touch input device of the present invention can overcome the drawbacks of the conventional small-sized touch input device and provide more functions to be operated by the user. Consequently, the multi-mode touch input device of the present invention is more user-friendly.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks of the prior art technologies, the present invention provides a multi-mode touch input device.

Figure 1:
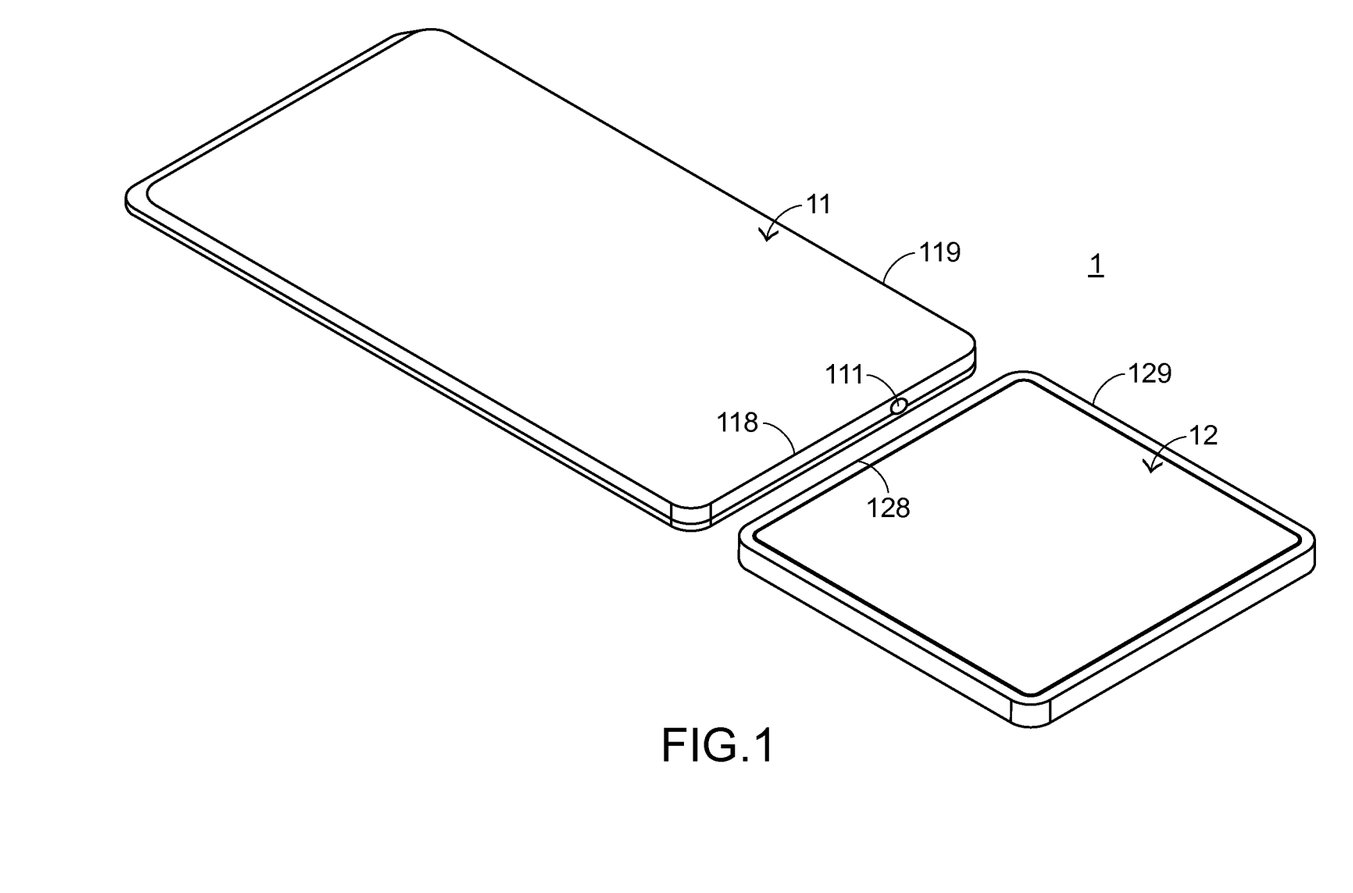
FIG. 1 is a schematic perspective view illustrating a multi-mode touch input device in a separate mode according to an embodiment of the present invention.
Figure 2:
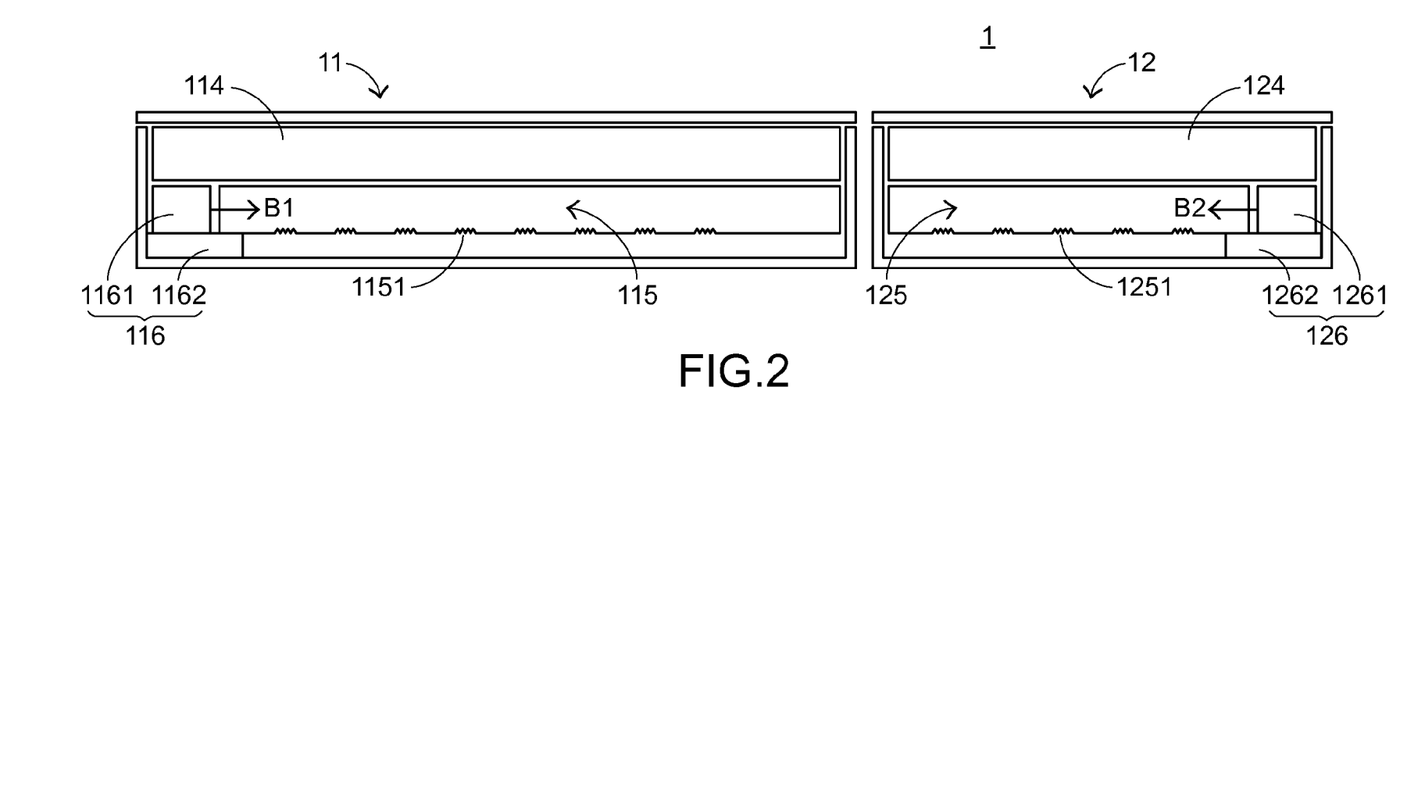
FIG. 2 is a schematic cross-sectional view illustrating the multi-mode touch input device of FIG. 1.

Hereinafter, the structures of a multi-mode touch input device of the present invention will be illustrated with reference to FIGS. 1 and 2. FIG. 1 is a schematic perspective view illustrating a multi-mode touch input device in a separate mode according to an embodiment of the present invention. FIG. 2 is a schematic cross-sectional view illustrating the multi-mode touch input device of FIG. 1. As shown in FIGS. 1 and 2, the multi-mode touch input device 1 comprises a first touch input device 11 and a second touch input device 12. When the first touch input device 11 is triggered by the user's finger or a stylus, the first touch input device 11 generates a first touch signal. The first touch input device 11 comprises a first sensing switch 111, a second sensing switch 112 (see FIG. 4), a first controlling unit 113 (see FIG. 4), a first touch sensitive module 114, a first light guide plate 115, a first illumination module 116, and a first wireless transmission module 117 (see FIG. 4). The first illumination module 116 comprises a first light-emitting element 1161 and a first illumination circuit board 1162. When the second touch input device 12 is triggered by the user's finger or the stylus, the second touch input device 12 generates a second touch signal. The second touch input device 12 comprises a third sensing switch 121 (see FIG. 5), a fourth sensing switch 122 (see FIG. 4), a second controlling unit 123 (see FIG. 4), a second touch sensitive module 124, a second light guide plate 125, a second illumination module 126, and a second wireless transmission module 127 (see FIG. 4). The second illumination module 126 comprises a second light-emitting element 1261 and a second illumination circuit board 1262. In this embodiment, the first touch input device 11 is a handwriting tablet with a handwriting or drawing function, and the second touch input device 12 is a touchpad with a function of controlling movement of a cursor of a computer system.

The components of the first touch input device 11 will be illustrated as follows. The first sensing switch 111 is disposed on a first lateral surface 118 of the first touch input device 11 and exposed outside. The second sensing switch 112 is disposed on a second lateral surface 119 of the first touch input device 11 and exposed outside. The first controlling unit 113 is connected with the first sensing switch 111 and the second sensing switch 112. When the first sensing switch 111 is triggered, the first controlling unit 113 controls the first touch input device 11 to be operated in a keyboard mode. When the second sensing switch 112 is triggered, the first controlling unit 113 controls the first touch input device 11 to be operated in a handwriting tablet mode. The first touch sensitive module 114 is disposed within the first touch input device 11. When the first touch sensitive module 114 is triggered by the user's finger or the stylus, the first touch sensitive module 114 generates the first touch signal. The first light guide plate 115 and the first touch sensitive module 114 are stacked on each other. Moreover, the first light guide plate 115 comprises plural first key patterns 1151. The plural first key patterns 1151 are disposed on a bottom surface of the first light guide plate 115. In the first illumination module 116, the first light-emitting element 1161 is disposed on the first illumination circuit board 1162 for emitting a first light beam B1. The first illumination circuit board 1162 is connected with the first controlling unit 113 and located at a side of the first light guide plate 115. The first illumination circuit board 1162 is used for providing electric power to drive the illumination of the first light-emitting element 1161. The first wireless transmission module 117 is connected with the first controlling unit 113. A first status signal S1 or a second status signal S2 outputted from the first controlling unit 113 may be transmitted through the first wireless transmission module 117.

In this embodiment, the length of the first lateral surface 118 of the first touch input device 11 is shorter than the length of the second lateral surface 119 of the first touch input device 11. Moreover, both of the first sensing switch 111 and the second sensing switch 112 are electromagnetic switches, the first controlling unit 113 is a micro controller, the first touch sensitive module 114 is a capacitive sensor, the first illumination module 116 is a light emitting diode (LED), and the first wireless transmission module 117 is a Bluetooth transmission module. Moreover, the plural first key patterns 1151 are symbol patterns corresponding to respective symbol keys. For example, the symbol keys comprise the keys A~Z, F1~F12, Esc, . . . , and so on. In other words, the plural first key patterns 1151 are correlated with the patterns of plural keys of a notebook computer. Moreover, if the first light beam B1 is not emitted by the first illumination module 116, the plural first key patterns 1151 are not visible through the first touch input device 11.

The components of the second touch input device 12 are similar to those of the first touch input device 11. The third sensing switch 121 (see FIG. 5) is disposed on a first lateral surface 128 of the second touch input device 12 and exposed outside. The fourth sensing switch 122 is disposed on a second lateral surface 129 of the second touch input device 12 and exposed outside. The second controlling unit 123 is connected with the third sensing switch 121 and the fourth sensing switch 122. When the third sensing switch 121 is triggered, the second touch input device 12 is operated in the keyboard mode under control of the second controlling unit 123. When the fourth sensing switch 122 is triggered, the second controlling unit 123 controls the second touch input device 12 to be operated in the handwriting tablet mode. The second touch sensitive module 124 is disposed within the second touch input device 12. When the second touch sensitive module 124 is triggered by the user's finger or the stylus, the second touch sensitive module 124 generates the second touch signal. The second light guide plate 125 and the second touch sensitive module 124 are stacked on each other. Moreover, the second light guide plate 125 comprises plural second key patterns 1251. The plural second key patterns 1251 are disposed on a bottom surface of the second light guide plate 125. In the second illumination module 126, the second light-emitting element 1261 is disposed on the second illumination circuit board 1262 for emitting a second light beam B2. The second illumination circuit board 1262 is connected with the second controlling unit 123 and located at a side of the second light guide plate 125. The second illumination circuit board 1262 is used for providing electric power to drive the illumination of the second light-emitting element 1261. The second wireless transmission module 127 is connected with the second controlling unit 123 for receiving the first status signal S1 or the second status signal S2 from the first wireless transmission module 117.

In this embodiment, the length of the first lateral surface 128 of the second touch input device 12 and the length of the second lateral surface 129 of the second touch input device 12 are nearly equal. Moreover, the length of the first lateral surface 128 of the second touch input device 12 is equal to the length of the first lateral surface 118 of the first touch input device 11. Moreover, both of the third sensing switch 121 and the fourth sensing switch 122 are electromagnetic switches, the second controlling unit 123 is a micro controller, the second touch sensitive module 124 is a capacitive sensor, the second illumination module 126 is a light emitting diode (LED), and the second wireless transmission module 127 is a Bluetooth transmission module. Moreover, the plural second key patterns 1251 are number patterns corresponding to respective numeric keys. For example, the numeric keys comprise the keys 0-9, the Num Lock key and other keys that are located at the right side of the keyboard. Moreover, if the second light beam B2 is not emitted by the second illumination module 126, the plural second key patterns 1251 are not visible through the second touch input device 12.

The operations of the multi-mode touch input device 1 in different operating modes will be illustrated as follows. Please refer to FIG. 1 again. As shown in FIG. 1, the first touch input device 11 and the second touch input device 12 of the multi-mode touch input device 1 are separated from each other. Since the first touch input device 11 and the second touch input device 12 are separated from each other, the first touch input device 11 may be individually used. For example, when the user's finger is moved on the first touch input device 11, plural first triggering positions are successively received by the first touch sensitive module 114, so that plural corresponding first touch signals are generated by the first touch sensitive module 114. Moreover, a first handwriting trajectory is formed according to the plural first touch signals. The first handwriting trajectory is transmitted to a computer system (not shown), which is in communication with the first touch input device 11. Consequently, a command of inputting the first handwriting trajectory is executed by the computer system. The first handwriting trajectory is a character, a symbol or a picture.

Similarly, when the first touch input device 11 and the second touch input device 12 are separated from each other, the second touch input device 12 may be individually used. For example, when the user's finger is moving on the second touch input device 12, plural second triggering positions are successively received by the second touch sensitive module 124, so that plural corresponding second touch signals are generated by the second touch sensitive module 124. Moreover, a displacement trajectory is formed according to the plural second touch signals. The displacement trajectory is transmitted to a computer system (not shown), which is in communication with the second touch input device 12. Consequently, a cursor (not shown) is moved by the computer system according to the displacement trajectory.

Figure 3:
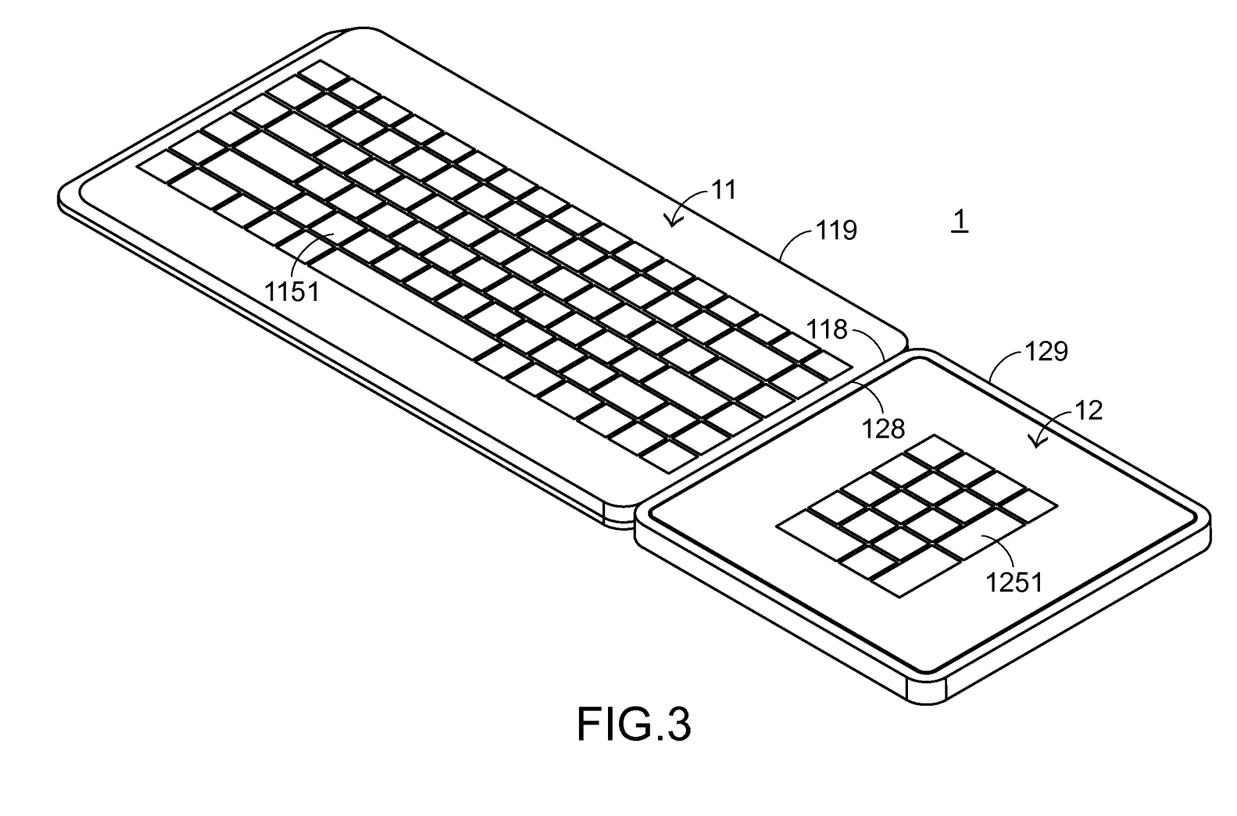
FIG. 3 is a schematic perspective view illustrating the multi-mode touch input device in a keyboard mode according to the embodiment of the present invention.
Figure 4:
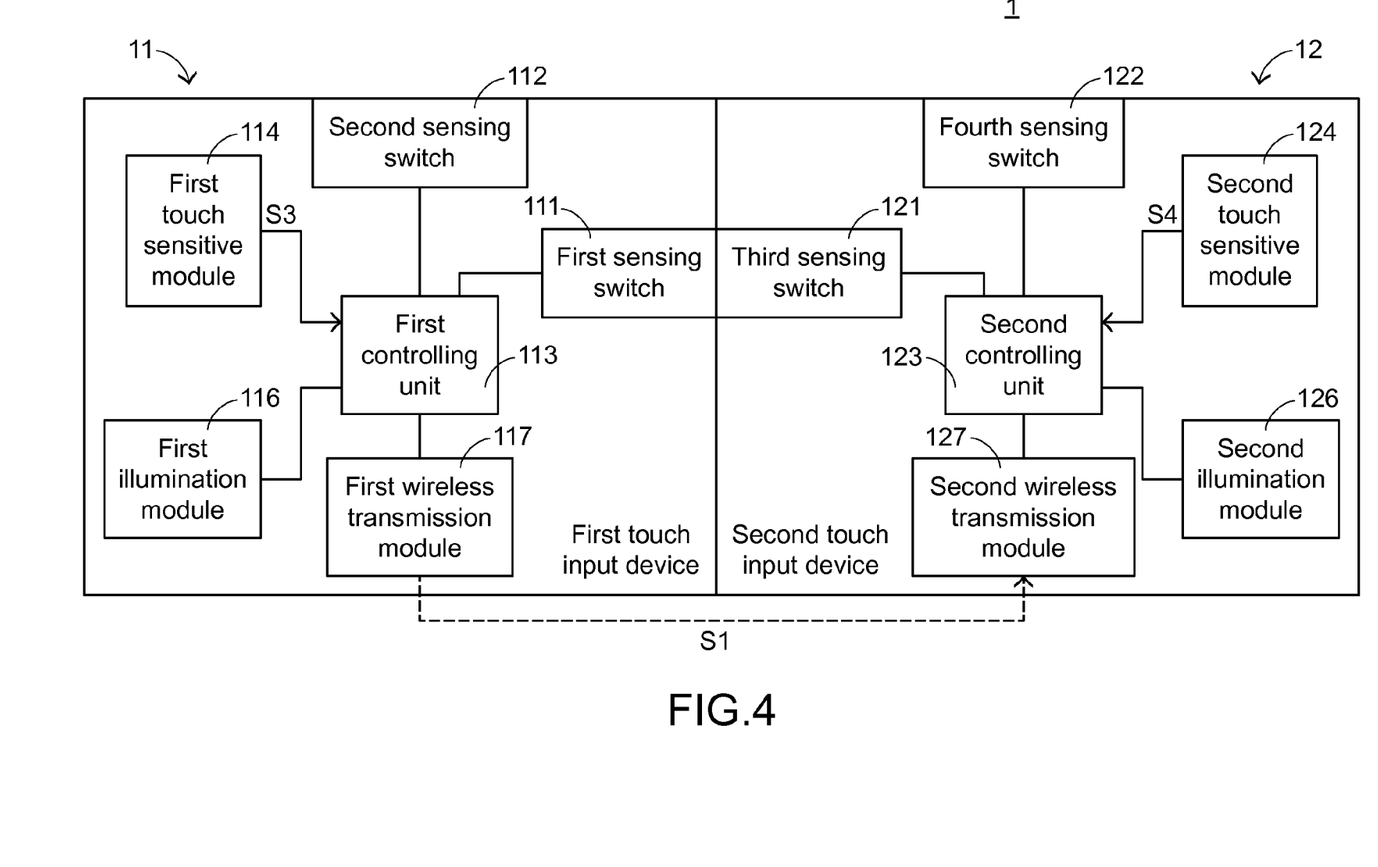
FIG. 4 is a schematic circuit block diagram illustrating the multi-mode touch input device in the keyboard mode according to the embodiment of the present invention.

FIG. 3 is a schematic perspective view illustrating the multi-mode touch input device in a keyboard mode according to the embodiment of the present invention. FIG. 4 is a schematic circuit block diagram illustrating the multi-mode touch input device in the keyboard mode according to the embodiment of the present invention. Please refer to FIGS. 1, 3 and 4. When the first lateral surface 118 of the first touch input device 11 and the first lateral surface 128 of the second touch input device 12 are combined together, the first sensing switch 111 on the first lateral surface 118 and the second sensing switch 112 on the first lateral surface 128 are contacted with each other and attracted by each other in response to their magnetic forces. Meanwhile, the first controlling unit 113 detects that the first sensing switch 111 is triggered. Consequently, the first controlling unit 113 controls the first touch input device 11 to be operated in the keyboard mode. Moreover, the first controlling unit 113 performs the following operations. Firstly, the first status signal S1 is generated by the first controlling unit 113, and the first status signal S1 is transmitted to the second touch input device 12 through the first wireless transmission module 117. Secondly, the first illumination module 116 is enabled by the first controlling unit 113, so that the first light beam B1 emitted by the first illumination module 116 is introduced into the first light guide plate 115. Under this circumstance, the plural first key patterns 1151 are visible through the first touch input device 11.

On the other hand, the second controlling unit 123 detects that the second sensing switch 121 is triggered. Consequently, the second controlling unit 123 controls the second touch input device 12 to be also operated in the keyboard mode. Meanwhile, the second illumination module 126 is enabled by the second controlling unit 123, so that the second light beam B2 emitted by the second illumination module 126 is introduced into the second light guide plate 125. Under this circumstance, the plural second key patterns 1251 are visible through the second touch input device 12. After the first status signal S1 is received by the second wireless transmission module 127, the first status signal S1 is transmitted to the second controlling unit 123. According to the first status signal S1, the second controlling unit 123 realizes that the first touch input device 11 is also operated in the keyboard mode. Consequently, both of the first touch input device 11 and the second touch input device 12 can be maintained in the keyboard mode. When the first lateral surface 118 of the first touch input device 11 and the first lateral surface 128 of the second touch input device 12 are combined together, the resulting structure is shown in FIG. 3.

When the first touch input device 11 is operated in the keyboard mode and the first key pattern 1151 corresponding to the key "F" is pressed by the user's finger, the first touch sensitive module 114 detects the first triggering position corresponding to key "F" and generates a first touch signal S3 corresponding to the first triggering position. According to the first touch signal S3, the computer system (not shown) in communication with the multi-mode touch input device 1 executes the command of inputting the letter "F". The operations of the second touch input device 12 are similar to the operations of the first touch input device 11. When the second touch input device 12 is operated in the keyboard mode and the second key pattern 1251 corresponding to the numeric key "1" is pressed by the user's finger, the second touch sensitive module 124 detects the second triggering position corresponding to the numeric key "1" and generates a second touch signal S4 corresponding to the second triggering position. According to the second touch signal S4, the computer system executes the command of inputting the number "1". The operations of the multi-mode touch input device 1 in the keyboard mode have been mentioned as above.

Figure 5:
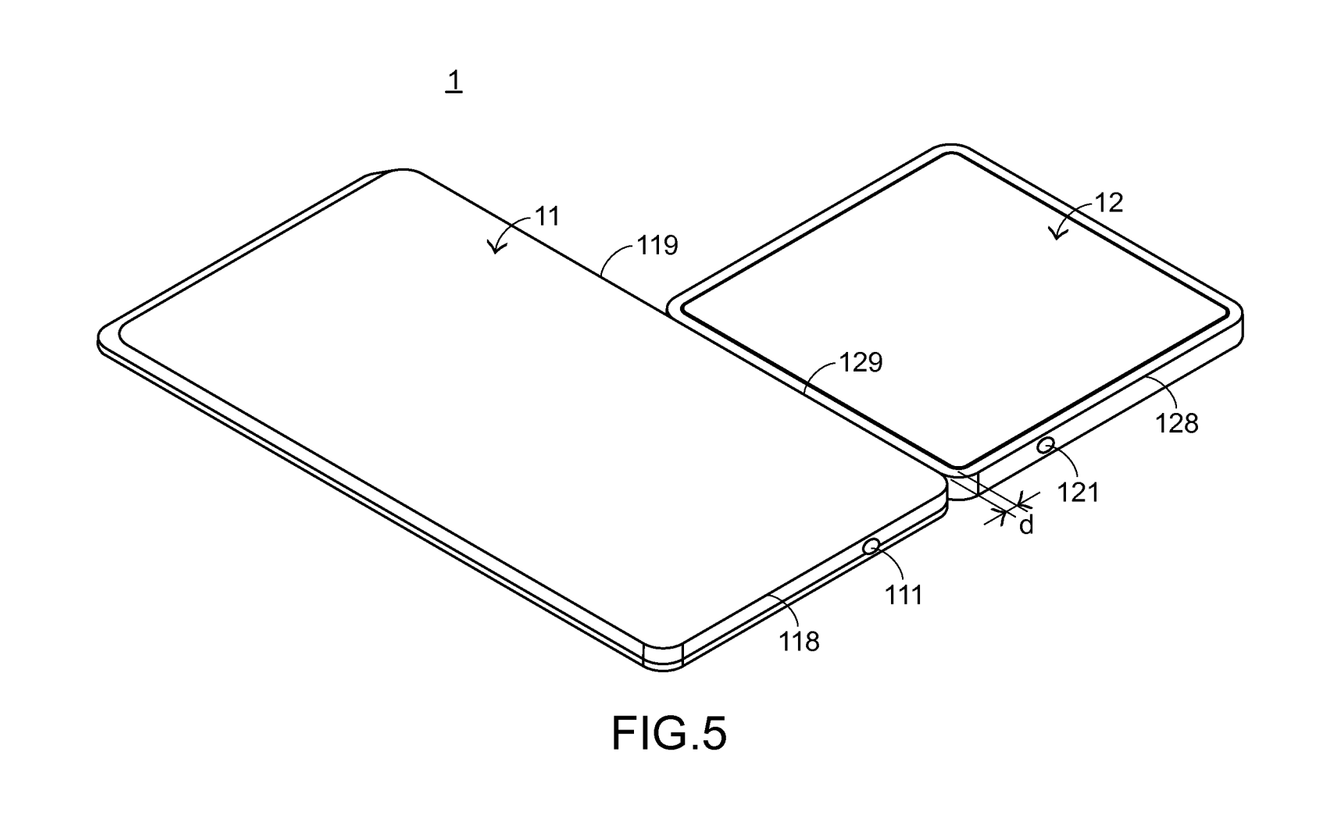
FIG. 5 is a schematic perspective view illustrating the multi-mode touch input device in a handwriting tablet mode according to the embodiment of the present invention.
Figure 6:
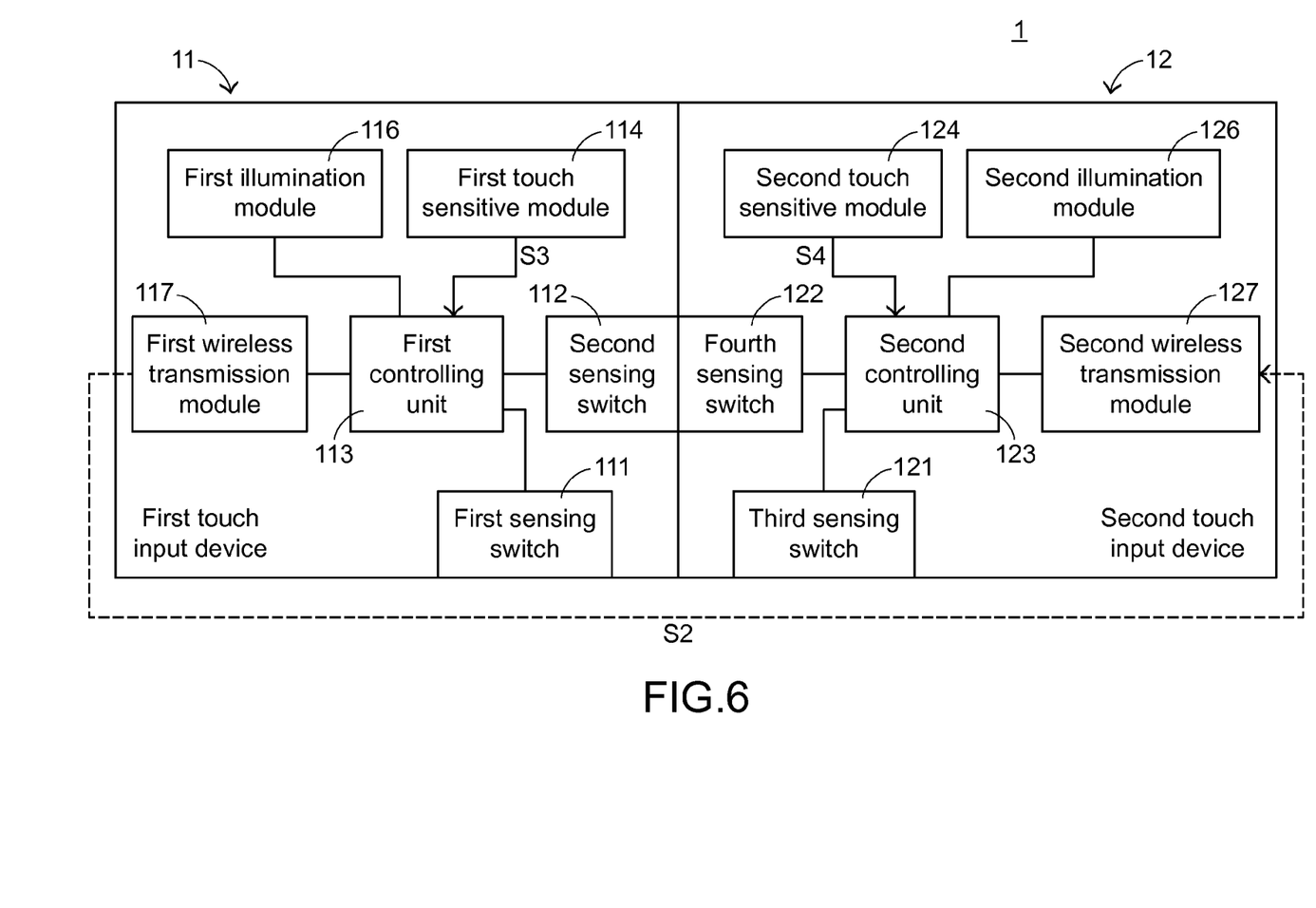
FIG. 6 is a schematic circuit block diagram illustrating the multi-mode touch input device in the handwriting tablet mode according to the embodiment of the present invention.

FIG. 5 is a schematic perspective view illustrating the multi-mode touch input device in a handwriting tablet mode according to the embodiment of the present invention. FIG. 6 is a schematic circuit block diagram illustrating the multi-mode touch input device in the handwriting tablet mode according to the embodiment of the present invention. Please refer to FIGS. 1, 5 and 6. When the second lateral surface 119 of the first touch input device 11 and the second lateral surface 129 of the second touch input device 12 are combined together, the second sensing switch 112 on the second lateral surface 119 and the fourth sensing switch 122 on the second lateral surface 129 are contacted with each other and attracted by each other in response to their magnetic forces. Meanwhile, the first controlling unit 113 detects that the second sensing switch 112 is triggered. Consequently, the first controlling unit 113 controls the first touch input device 11 to be operated in the handwriting tablet mode. Meanwhile, the second status signal S2 is generated by the first controlling unit 113, and the second status signal S2 is transmitted to the second touch input device 12 through the first wireless transmission module 117. Under this circumstance, the first illumination module 116 is not enabled by the first controlling unit 113. Consequently, the plural first key patterns 1151 are not visible through the first touch input device 11.

On the other hand, the second controlling unit 123 detects that the fourth sensing switch 122 is triggered. Consequently, the second controlling unit 123 controls the second touch input device 12 to be also operated in the handwriting tablet mode. Meanwhile, the second illumination module 126 is not enabled by the second controlling unit 123. Under this circumstance, the plural second key patterns 1251 are not visible through the second touch input device 12. After the second status signal S2 is received by the second wireless transmission module 127, the second status signal S2 is transmitted to the second controlling unit 123. According to the second status signal S2, the second controlling unit 123 realizes that the first touch input device 11 is also operated in the handwriting tablet mode. When the second lateral surface 119 of the first touch input device 11 and the second lateral surface 129 of the second touch input device 12 are combined together, the resulting structure is shown in FIG. 5. Under this circumstance, the original handwriting area of the first touch input device 11 is enlarged to the overall handwriting area of the first touch input device 11 and the second touch input device 12.

The operations of the second touch input device 12 in the handwriting tablet mode are similar to the operations of the first touch input device 11 in the handwriting tablet mode. The operations of the second touch input device 12 in the handwriting tablet mode will be illustrated as follows. For example, when the user's finger is moved on the second touch input device 12, plural second triggering positions are successively received by the second touch sensitive module 124, so that plural corresponding second touch signals are generated by the second touch sensitive module 124. Moreover, a second handwriting trajectory is formed according to the plural second touch signals. The second handwriting trajectory is transmitted to the computer system, which is in communication with the second touch input device 12. Consequently, a command of inputting the second handwriting trajectory is executed by the computer system. The second handwriting trajectory is a character, a symbol or a picture.

The operations of the first touch input device 11 and the second touch input device 12 in response to the user's handwriting action will be illustrated as follows. For example, when both of the first touch input device 11 and the second touch input device 12 are in the handwriting tablet mode, the user may write a letter "W" on the overall handwriting area of the first touch input device 11 and the second touch input device 12. Consequently, a first handwriting trajectory corresponding to the letter "V" and a second handwriting trajectory corresponding to the letter "V" are sequentially generated by the first touch sensitive module 114 and the second touch sensitive module 124, respectively. The first handwriting trajectory corresponding to the letter "V" is the half-left portion of the letter "W", and the second handwriting trajectory corresponding to the letter "V" is the right-left portion of the letter "W". Then, the second handwriting trajectory corresponding to the letter "V" is transmitted to the first controlling unit 113 of the first touch input device 11 through the second wireless transmission module 127. Then, the first controlling unit 113 judges whether the time period between the final time point of the first handwriting trajectory and the initial time point of the second handwriting trajectory is within a predetermined time interval (e.g. 1 second). If the judging condition is satisfied, the first controlling unit 113 will further judge whether the first handwriting trajectory and the second handwriting trajectory are connected with each other. That is, if the first controlling unit 113 judges that the above time period between the final time point and the initial time point is within the predetermined time interval, the first controlling unit 113 will perform a next judging procedure of judging the distance between the first handwriting trajectory and the second handwriting trajectory. On the other hand, if the above time period between the final time point and the initial time point is longer than the predetermined time interval, the first handwriting trajectory and the second handwriting trajectory are not connected with each other by the first controlling unit 113.

While the first controlling unit 113 judges the distance between the first handwriting trajectory and the second handwriting trajectory, the first controlling unit 113 judges whether the distance between the final position of the first handwriting trajectory and the initial position of the second handwriting trajectory is within a predetermined distance d.

According to the judging condition, the first controlling unit 113 may judge whether the first handwriting trajectory and the second handwriting trajectory are connected with each other. The predetermined distance d is the length of the edge region that cannot be detected by the second touch input device 12 through touch-sensitive detection. If the distance between the final position of the first handwriting trajectory and the initial position of the second handwriting trajectory is within the predetermined distance d, the first handwriting trajectory and the second handwriting trajectory are connected with each other by the first controlling unit 113. Consequently, the handwriting trajectory corresponding to the letter "W" is generated. On the other hand, if the distance between the final position of the first handwriting trajectory and the initial position of the second handwriting trajectory is longer than the predetermined distance d, the first handwriting trajectory and the second handwriting trajectory are not connected with each other by the first controlling unit 113. Under this circumstance, two handwriting trajectories corresponding to the letter "V" are generated. The operations of the multi-mode touch input device 1 in the handwriting tablet mode have been mentioned as above.

The following three aspects should be specially described. Firstly, if the operating modes of the first touch input device 11 and the second touch input device 12 are different, the operating modes of the first touch input device 11 and the second touch input device 12 can be adjusted to be identical by the following methods. For example, when the first lateral surface 118 of the first touch input device 11 and the first lateral surface 128 of the second touch input device 12 are combined together but the fourth sensing switch 122 is erroneously pressed, the first controlling unit 113 judges that the first touch input device 11 is operated in the keyboard mode because the first sensing switch 111 of the first touch input device 11 is triggered. However, since both of the third sensing switch 121 and the fourth sensing switch 122 of the second touch input device 12 are triggered, the second controlling unit 123 cannot judge whether the second touch input device 12 is operated in the keyboard mode or the handwriting tablet mode. Meanwhile, the first status signal S1 from the first controlling unit 113 is transmitted to the second touch input device 12 through the first wireless transmission module 117. After the first status signal S1 is received by the second controlling unit 123, the second controlling unit 123 judges that the second touch input device 12 is operated in the keyboard mode.

Secondly, in this embodiment, the first status signal S1 or the second status signal S2 is transmitted from the first controlling unit 113 to the second touch input device 12. In another embodiment, the first status signal or the second status signal may be transmitted from the second controlling unit to the first touch input device. In a preferred embodiment, the first status signal or the second status signal is transmitted between the first controlling unit and the second controlling unit. Under this circumstance, the identical operating mode of the first touch input device and the second touch input device can be ensured, and the possibility of causing erroneous operation will be minimized.

Thirdly, in this embodiment, the shapes of the first touch input device and the second touch input device of the multi-mode touch input device are rectangular. It is noted that the shapes of the first touch input device and the second touch input device may be altered according to the practical requirements. However, the first lateral surface of the first touch input device and the first lateral surface of the second touch input device should have complementary shapes, and the second lateral surface of the first touch input device and the second lateral surface of the second touch input device should have complementary shapes.

From the above descriptions, the present invention provides a multi-mode touch input device with a first touch input device and a second touch input device. The first touch input device and the second touch input device may be combined together to provide various outer shapes. When the first lateral surface of the first touch input device and the first lateral surface of the second touch input device are combined together, the multi-mode touch input device has a first outer shape. When the second lateral surface of the first touch input device and the second lateral surface of the second touch input device are combined together, the multi-mode touch input device has a second outer shape. Moreover, according to different outer shapes, the multi-mode touch input device provides different functions. For example, the first touch input device may be individually used as a handwriting tablet, the second touch input device may be individually used as a touchpad, the first touch input device and the second touch input device may be collaboratively used as a touch keyboard, or the first touch input device and the second touch input device may be collaboratively used as a handwriting tablet. In other words, the multi-mode touch input device of the present invention can overcome the drawbacks of the conventional small-sized touch input device and providing more functions to be operated by the user. Consequently, the multi-mode touch input device of the present invention is more user-friendly.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A multi-mode touch input device, comprising:
   a first touch input device generating a first touch signal; and
   a second touch input device generating a second touch signal, wherein when a first lateral surface of the first touch input device and a first lateral surface of the second touch input device are combined together, both of the first touch input device and the second touch input device are operated in a keyboard mode, and the first touch input device and the second touch input device are collaboratively defined as a touch keyboard, wherein when a second lateral surface of the first touch input device and a second lateral surface of the second touch input device are combined together, both of the first touch input device and the second touch input device are operated in a handwriting tablet mode, and the first touch input device and the second touch input device are collaboratively defined as a handwriting tablet
   wherein the first touch input device comprises:
      a first sensing switch disposed on the first lateral surface of the first touch input device;
      a second sensing switch disposed on the second lateral surface of the first touch input device; and
      a first controlling unit connected with the first sensing switch and the second sensing switch, wherein when the first sensing switch is triggered, the first controlling unit controls the first touch input device to be operated in the keyboard mode, wherein when the second sensing switch is triggered, the first controlling unit controls the first touch input device to be operated in the handwriting tablet mode,
   wherein the second touch input device comprises:
      a third sensing switch disposed on the first lateral surface of the second touch input device;
      a fourth sensing switch disposed on the second lateral surface of the second touch input device; and
      a second controlling unit connected with the third sensing switch and the fourth sensing switch, wherein when the third sensing switch is triggered, the second controlling unit controls the second touch input device to be operated in the keyboard mode, wherein when the fourth sensing switch is triggered, the second controlling unit controls the second touch input device to be operated in the handwriting tablet mode,
   wherein when the first lateral surface of the first touch input device and the first lateral surface of the second touch input device are combined together, the first sensing switch is triggered by the second touch input device and the third sensing switch is triggered by the first touch input device, wherein when the second lateral surface of the first touch input device and the second lateral surface of the second touch input device are combined together, the second sensing switch is triggered by the second touch input device and the fourth sensing switch is triggered by the first touch input device.

2. The multi-mode touch input device according to claim 1, wherein the first touch input device further comprises a first wireless transmission module, and the first wireless transmission module is connected with the first controlling unit, wherein a first status signal or a second status signal from the first controlling unit is transmitted through the first wireless transmission module, wherein the second touch input device further comprises a second wireless transmission module, and the second wireless transmission module is connected with the second controlling unit in a wireless transmission manner and receives the first status signal or the second status signal, wherein the second touch input device is operated in the keyboard mode according to the first status signal or the second touch input device is operated in the handwriting tablet mode according to the second status signal, wherein when the first controlling unit detects that the first sensing switch is triggered, the first status signal is transmitted through the first wireless transmission module, wherein when the first controlling unit detects that the second sensing switch is triggered, the second status signal is transmitted through the first wireless transmission module.

3. The multi-mode touch input device according to claim wherein when the first sensing switch and the third sensing switch are combined together, the first lateral surface of the first touch input device and the first lateral surface of the second touch input device are combined together, wherein when the second sensing switch and the fourth sensing switch are combined together, the second lateral surface of the first touch input device and the second lateral surface of the second touch input device are combined together, wherein the first sensing switch, the second sensing switch, the third sensing switch and the fourth sensing switch are electromagnetic switches.

4. The multi-mode touch input device according to claim 1, wherein the first touch input device further comprises:
   a first touch sensitive module, wherein when the first touch sensitive module is triggered, a first touch signal is generated by the first touch sensitive module;
   a first light guide plate stacked on the first touch sensitive module, wherein the first light guide plate has plural first key patterns; and a first illumination module connected with the first controlling unit and located at a side of the first light guide plate, wherein the first illumination module emits a first light beam, wherein the second touch input device further comprises:

a second touch sensitive module, wherein when the second touch sensitive module is triggered, a second touch signal is generated by the second touch sensitive module;

a second light guide plate stacked on the second touch sensitive module, wherein the second light guide plate has plural second key patterns; and a second illumination module connected with the second controlling unit and located at a side of the second light guide plate, wherein the second illumination module emits a second light beam.

5. The multi-mode touch input device according to claim 4, wherein when the first controlling unit detects that the first sensing switch is triggered, the first illumination module is enabled by the first controlling unit, wherein after the first illumination module is enabled, the first light beam is introduced into the first light guide plate, so that the plural first key patterns are visible through the first touch input device, wherein when the first illumination module is not enabled, the plural first key patterns are not visible through the first touch input device, wherein when the second controlling unit detects that the third sensing switch is triggered, the second illumination module is enabled by the second controlling unit, wherein after the second illumination module is enabled, the second light beam is introduced into the second light guide plate, so that the plural second key patterns are visible through the second touch input device, wherein when the second illumination module is not enabled, the plural second key patterns are not visible through the second touch input device.

6. The multi-mode touch input device according to claim 4, wherein the plural first key patterns are symbol patterns corresponding to respective symbol keys, and the plural second key patterns are number patterns corresponding to respective numeric keys.

7. The multi-mode touch input device according to claim 4, wherein when the first touch input device is in the keyboard mode, the first touch sensitive module detects a first triggering position and generates the first touch signal corresponding to the first triggering position, or the second touch sensitive module detects a second triggering position and generates the second touch signal corresponding to the second triggering position, wherein when the first touch input device is in the handwriting tablet mode, the first touch sensitive module sequentially detects plural first triggering positions and generates plural corresponding first touch signals so as to form a first handwriting trajectory corresponding to the plural corresponding first touch signals, or the second touch sensitive module sequentially detects plural second triggering positions and generates plural corresponding second touch signals so as to form a second handwriting trajectory corresponding to the plural corresponding touch signals.

8. The multi-mode touch input device according to claim 7, wherein when the first touch input device and the second touch input device are operated in the handwriting tablet mode and the first handwriting trajectory and the second handwriting trajectory are sequentially generated by the first touch sensitive module and the second touch sensitive module, the first controlling unit judges whether a time period between a final time point of the first handwriting trajectory and an initial time point of the second handwriting trajectory is within a predetermined time interval, thereby judging whether the first handwriting trajectory and the second handwriting trajectory are connected with each other, wherein if the time period between the final time point of the first handwriting trajectory and the initial time point of the second handwriting trajectory is within the predetermined time interval, the first controlling unit further judges a distance between the first handwriting trajectory and the second handwriting trajectory, wherein if the time period between the final time point of the first handwriting trajectory and the initial time point of the second handwriting trajectory is not within the predetermined time interval, the first handwriting trajectory and the second handwriting trajectory are not connected with each other by the first controlling unit.

9. The multi-mode touch input device according to claim 8, wherein while the first controlling unit judges the distance between the first handwriting trajectory and the second handwriting trajectory, the first controlling unit judges whether a distance between a final position of the first handwriting trajectory and an initial position of the second handwriting trajectory is within a predetermined distance, thereby judging whether the first handwriting trajectory and the second handwriting trajectory are connected with each other, wherein if the distance between the final position of the first handwriting trajectory and the initial position of the second handwriting trajectory is not within the predetermined distance, the first handwriting trajectory and the second handwriting trajectory are not connected with each other by the first controlling unit.

* * * * *